(No Model.)
J. B. GRAY.
WHEEL SCRAPER.
No. 592,519. Patented Oct. 26, 1897.
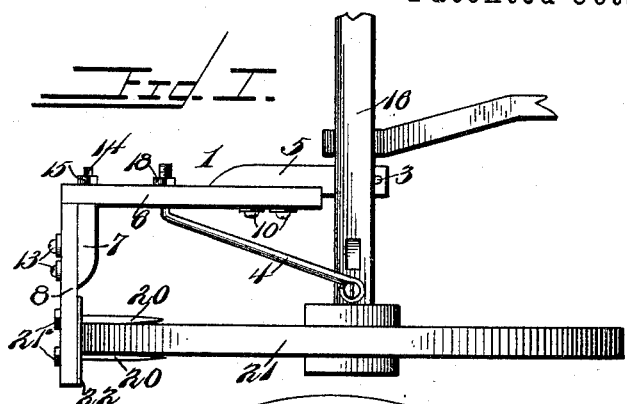
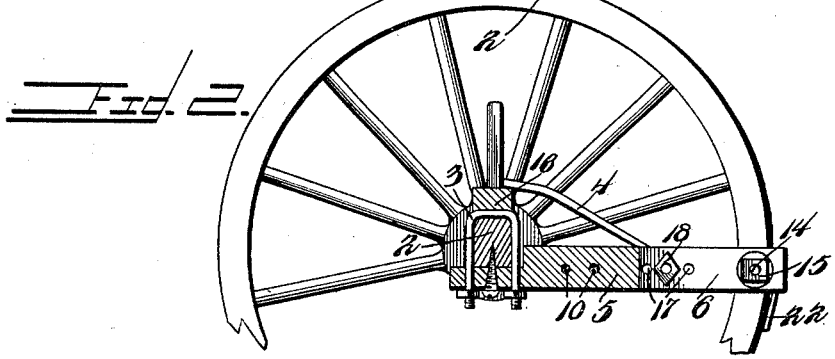
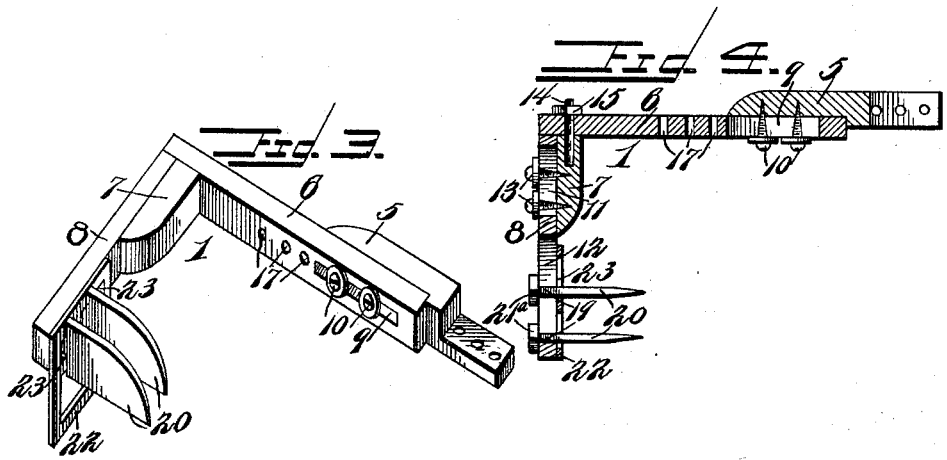
Witnesses
R. T. Shepard
N. J. Riley
Inventor
John B. Gray.
By his Attorneys,
C. A. Snow & Co.

UNITED STATES PATENT OFFICE.

JOHN B. GRAY, OF LIBERTY HILL, TEXAS, ASSIGNOR OF ONE-HALF TO T. L. GRAY, OF SAME PLACE.

WHEEL-SCRAPER.

SPECIFICATION forming part of Letters Patent No. 592,519, dated October 26, 1897.

Application filed July 10, 1897. Serial No. 644,097. (No model.)

*To all whom it may concern:*

Be it known that I, JOHN B. GRAY, a citizen of the United States, residing at Liberty Hill, in the county of Williamson and State of Texas, have invented a new and useful Wheel-Scraper, of which the following is a specification.

The invention relates to improvements in wheel-scrapers.

The object of the present invention is to improve the construction of wheel-scrapers and to provide a simple, inexpensive, and efficient one adapted to be readily mounted on a vehicle and capable of effectively removing mud from a wheel.

A further object of the invention is to provide a mud-scraper which will be capable of longitudinal and lateral adjustment to suit the position and size of a wheel, so that the scraping-blades may be arranged to operate properly on the same.

The invention consists in the construction and novel combination and arrangement of parts, as hereinafter fully described, illustrated in the accompanying drawings, and pointed out in the claims hereto appended.

In the drawings, Figure 1 is a plan view of a portion of a vehicle provided with a wheel-scraper constructed in accordance with this invention. Fig. 2 is a vertical longitudinal sectional view. Fig. 3 is a perspective view of the device detached. Fig. 4 is a longitudinal sectional view of the same.

Like numerals of reference designate corresponding parts in all the figures of the drawings.

1 designates a substantially L-shaped supporting-frame extending rearward from an axle 2 and secured to the same by a clip 3, embracing the axle and having its sides passing through perforations of the supporting-frame and threaded for the reception of nuts. The frame, which is composed of longitudinal and transverse bars, is supported by an inclined brace 4. The longitudinal bar consists of two adjustable sections 5 and 6, and the transverse bar is made up of similar sections 7 and 8.

The outer section 6 of the longitudinal bar is provided at its inner end with a longitudinal slot 9, through which pass clamping-screws 10, which secure the sections at the desired adjustment.

The outer section 8 of the transverse portion of the frame is provided with inner and outer longitudinal slots 11 and 12 and is secured at the desired adjustment by clamping-screws 13, which pass through the inner slot 11. The inner section 7 of the transverse portion of the frame is provided with a threaded shank or stud 14, which passes through a perforation of the section 6 of the longitudinal portion of the frame and receives a nut 15.

The brace 4, which is inclined, is secured at its upper end to the bolster 16, and its lower rear end is bent at right angles and is passed through one of a series of perforations 17 of the section 6 and is threaded for the reception of a nut 18.

The outer longitudinal slot 12 of the transverse portion of the frame receives shanks 19 of vertically-disposed scraper-blades 20, located at opposite sides of a wheel 21 and adapted to remove mud from the same. The shanks 19 are threaded and receive nuts 21$^a$, and the fastening devices for mounting the vertically-disposed side scrapers 20 also serve as the means for attaching a transverse scraping-blade 22 to the supporting-frame. The scraping-blade 22, which is rectangular and which removes mud from the periphery of the wheel, is provided with slots 23 and is interposed between the front face of the section 8 and the shoulders of the side scrapers 20.

The invention has the following advantages: It is capable of effectually removing heavy black tenacious earth and similar soil from vehicle-wheels and enables a vehicle to run comparatively easy over heavy roads.

The device is also capable of both longitudinal and lateral adjustment and may be readily arranged to position the scraping-blades properly with relation to the periphery of a wheel, and the side scrapers secure the transverse scraping-blade to the supporting-frame and are capable of adjustment to and from each other to vary the distance between them to suit the size of a wheel.

What I claim is—

1. A device of the class described comprising an adjustable supporting-frame provided with means for attaching it to a vehicle, a transverse scraper-blade provided with slots, and side scrapers passing through the slots of the transverse scraping-blade and securing the same to the supporting-frame, substantially as described.

2. A device of the class described comprising a substantially L-shaped supporting-frame capable of longitudinal and transverse adjustment and provided with a longitudinal slot, the adjustable side scrapers having threaded shanks arranged in said slot and provided with nuts, and a transverse scraping-blade provided with openings receiving the said shanks, substantially as described.

3. In a device of the class described, the combination of an L-shaped supporting-frame comprising the longitudinally-disposed sections 5 and 6 adjustably connected together and the transverse sections 7 and 8 adjustable on each other and extending from the outer end of the section 6, the adjustable side scrapers, the transverse scraping-blade, and the inclined brace adjustably secured to the section 6, substantially as described.

In testimony that I claim the foregoing as my own I have hereto affixed my signature in the presence of two witnesses.

JOHN B. GRAY.

Witnesses:
J. W. GRAY,
J. T. GRAY.